United States Patent
Angilly, Jr. et al.

[15] 3,667,195
[45] June 6, 1972

[54] ROTARY AIR FILTER CLEANING APPARATUS

[72] Inventors: Fredrick Ernest Angilly, Jr., Cranston; George Lindol Miner, Warwick; Lionel Anthony James Sousa, Coventry, all of R.I.

[73] Assignee: Grinnell Corporation, Providence, R.I.

[22] Filed: Mar. 16, 1970

[21] Appl. No.: 19,731

[52] U.S. Cl. ..............55/272, 15/312, 55/283, 55/290, 55/294, 55/302, 55/351, 55/400, 74/25, 74/424.8, 242/158.2
[51] Int. Cl. .............................................B01d 41/04
[58] Field of Search..............55/290, 294; 15/312; 248/424, 248/429; 74/25, 424.8, 27, 39, 49, 55, 56–58, 89.14; 242/158.2, 158.3; 254/7, 13, 41

[56] References Cited

UNITED STATES PATENTS

| | | | |
|---|---|---|---|
| 1,630,972 | 5/1927 | Schmid | 15/312 R |
| 3,392,655 | 7/1968 | Chambers et al. | 55/294 X |
| 139,585 | 6/1873 | Lacroix | 55/294 X |
| 2,676,352 | 4/1954 | Moore | 15/312 R |
| 2,961,277 | 11/1960 | Sternlicht | 308/78 |
| 3,345,805 | 10/1967 | Sherrill | 55/294 X |
| 3,472,002 | 10/1969 | Brown et al. | 55/294 X |
| 3,483,675 | 12/1969 | King | 55/290 |
| 3,499,267 | 3/1970 | King et al. | 55/290 |
| 3,505,792 | 4/1970 | Dahlem | 55/294 |
| 3,568,414 | 3/1971 | Spriggs et al. | 55/294 |

*Primary Examiner*—Dennis E. Talbert, Jr.
*Assistant Examiner*—Vincent Gifford
*Attorney*—H. Edward Foerch

[57] ABSTRACT

This specification discloses vacuum cleaning apparatus for a rotary drum filter in which a drive screw for moving the suction nozzle axially of the rotary drum is supported by two movable bearings in addition to end bearings. The movable bearings are positioned on guide members which extend parallel to the drive screw to support the drive screw against sagging at locations between the suction nozzle and the end bearings. The movable bearing are spaced by rigid connecting rods. As one movable bearing is pushed along the guide member by the advancing suction nozzle, the rods pull the other movable bearing along to support the drive screw.

5 Claims, 7 Drawing Figures

ROTARY AIR FILTER CLEANING APPARATUS

BACKGROUND OF INVENTION

One type of filter which is used for cleaning air which is circulated in an air conditioning or air filtering system is a rotary drum filter in which air is forced to flow, or is drawn, through a filter media which is secured around the circumference of the drum. In order to remove accumulated lint from the surface of the filter media, the drum is rotated and a suction nozzle which is connected to a vacuum source is positioned adjacent to the media surface where it can vacuum the surface as the drum rotates and moves the filter media past the suction nozzle. Generally, the nozzle has an axial length which is only a fraction of the width of the drum in order to limit the power requirements of the vacuum source. The nozzle is caused to move axially of the drum, either continuously or periodically, to clean full width of the filter. Upon reaching an end of the drum in one direction, the nozzle reverses its direction of movement, or is otherwise returned to its starting position at the first end of the drum, to repeat its vacuum cleaning cycle.

One drive means which has been used is a drive screw suitably mounted in end bearings for rotation about its axis. A reversible motor rotates the drive screw alternately in forward and reverse directions to cause a nozzle mounted on the drive screw to traverse the width of the equipment to be cleaned (see for example U.S. Pat. No. 1,630,972). While a drive arrangement of this type has been found satisfactory for screw lengths which are relatively short; the drive screw tends to sag or bow for longer lengths, particularly if the suction nozzle causes much drag or load on the drive screw. This sagging is undesirable and accordingly limits the length of the drive screw and the length of the equipment which can be serviced by a single suction nozzle.

One solution to the problem has been to increase the diameter of the drive screw in relation to its length, but this procedure adds to the cost and increases the bulk of the entire drive arrangement.

SUMMARY OF INVENTION

The invention provides a means for supporting the drive screw for apparatus for cleaning of filter media on a rotary drum filter. A guide means which comprises channel members extends parallel to the drive screw. Movable bearing means or support members are constructed for movement along the channel members and for bearing engagement with the drive screw. The support members are preferably made of wood blocks. They are arranged and spaced on opposite sides of the traveling supports by a distance between blocks of approximately half of the distance traveled by the suction nozzle. The spacing is maintained by metal rods between the blocks. Movement of the suction nozzle pushes one or the other of the support members along the guide. The second support member is pulled along by the metal rods and provides movable bearing support for the drive screw. Thus, the drive screw is never unsupported by a distance which is greater than approximately half of the drive screw.

Accordingly, the principal object of this invention is to provide a vacuum cleaning apparatus for a rotary filter in which a drive screw extends approximately the length of the filter to traverse a suction nozzle mounted thereon axially of the drum, the drive screw being supported between its end supports and a support at the suction nozzle to limit sagging of the screw.

Other objects will appear hereinafter.

The best modes in which I have contemplated applying the principles of the present invention are shown in the accompanying drawings, but these are to be deemed primarily illustrative for it is intended that the claims shall cover by suitable expression in the appended claims whatever of patentable subject matter resides in the invention disclosed.

Figure 1:
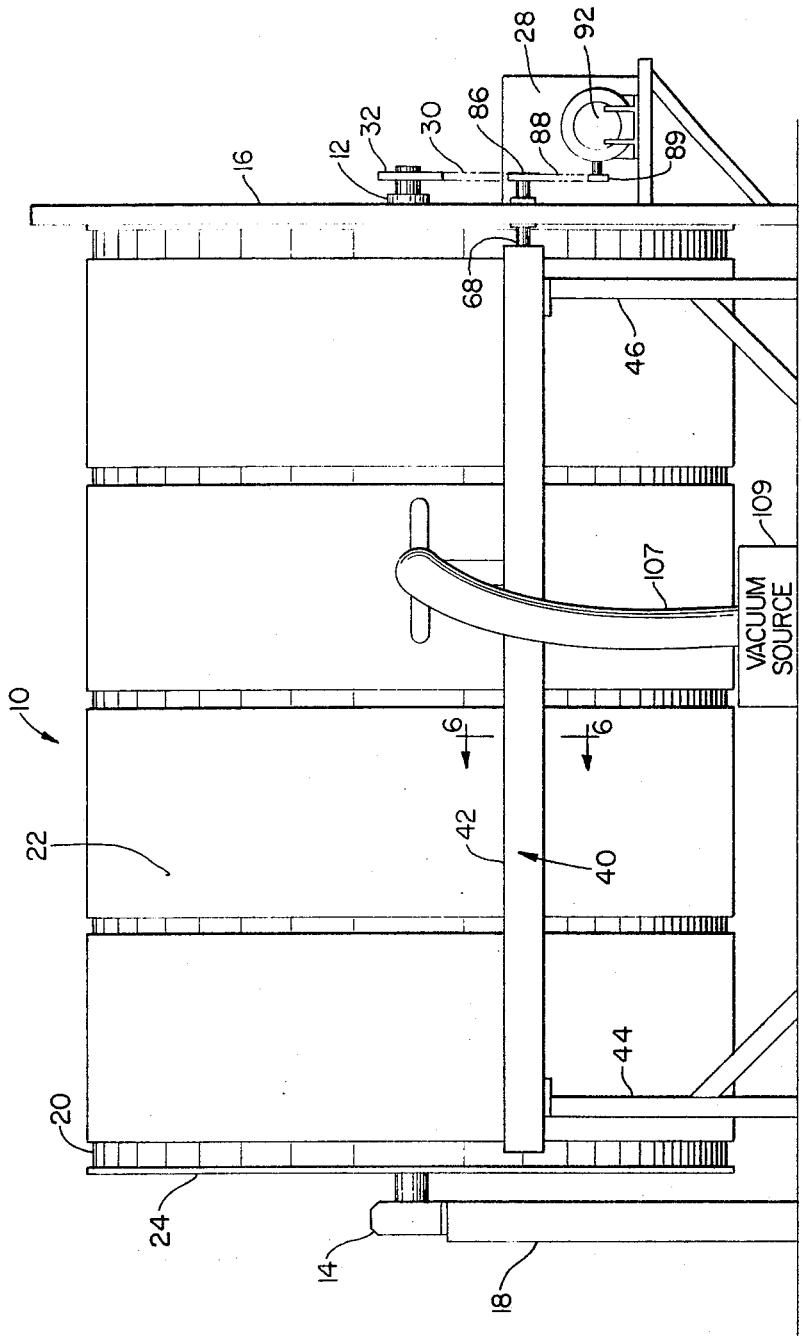
FIG. 1 is a side plan view of a rotary drum filter showing the cleaning apparatus according to the present invention.

Referring now more particularly to FIG. 1, a conventional rotary drum filter 10 is shown mounted in end bearings 12 and 14 for rotation about its axis. The end bearing 12 is supported by an end wall 16 and the end bearing 14 is supported on a column 18.

The rotary drum filter 10 is fabricated in a conventional manner to present an outer cylindrical surface 20. A filter media 22 is attached to the surface 20 so as to cover substantially the entire cylindrical surface.

Figure 2:
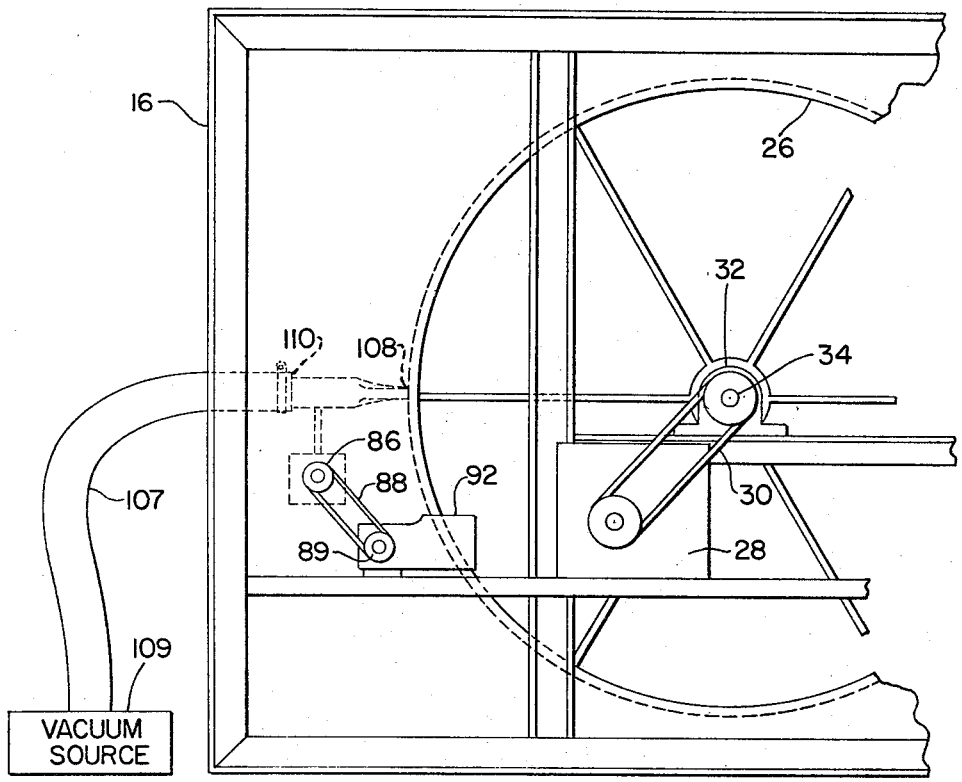
FIG. 2 is a partial end view of the drum filter of FIG. 1.

As seen in FIG. 2, end wall 16 has an opening 26 which communicates with the interior of the cylinder 10. The end wall 16 may be arranged in an air circulating system, and preferably is mounted between two rooms in a conventional manner. Fan means (not shown) in the air circulating system causes air to flow through the filter media where it is filtered, into the rotary drum 10 and out through the opening 26. The end 24 of the drum is closed by a suitable means to prevent air which is to be filtered from by-passing the filter media as it flows through the rotary drum filter. As air flows through the filter media, lint and other substances carried by the air are deposited on the outer surface of the filter media. The drum filter is rotated by an electric motor 28 connected to a suitable electrical source (not shown). The motor drives a chain 30 engaging a sprocket 32 on the shaft 34 of the drum filter.

Figure 6:
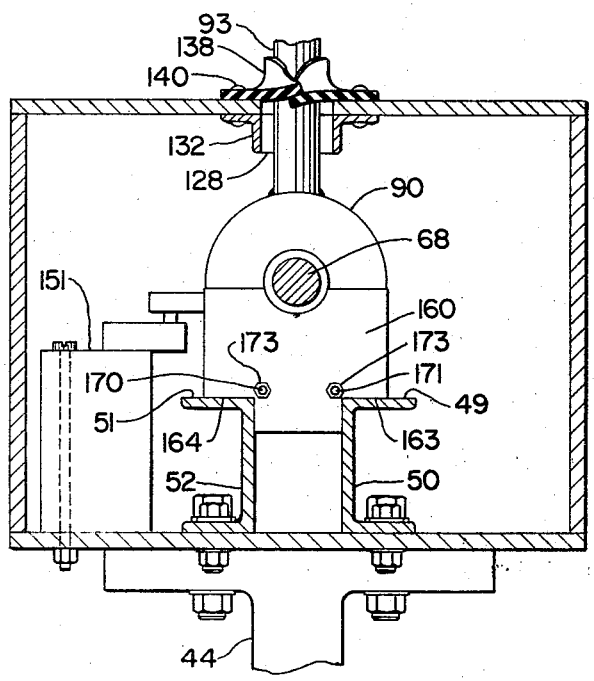
FIG. 6 is a sectional view taken long lines 6—6 of FIG. 3.
Figure 3:
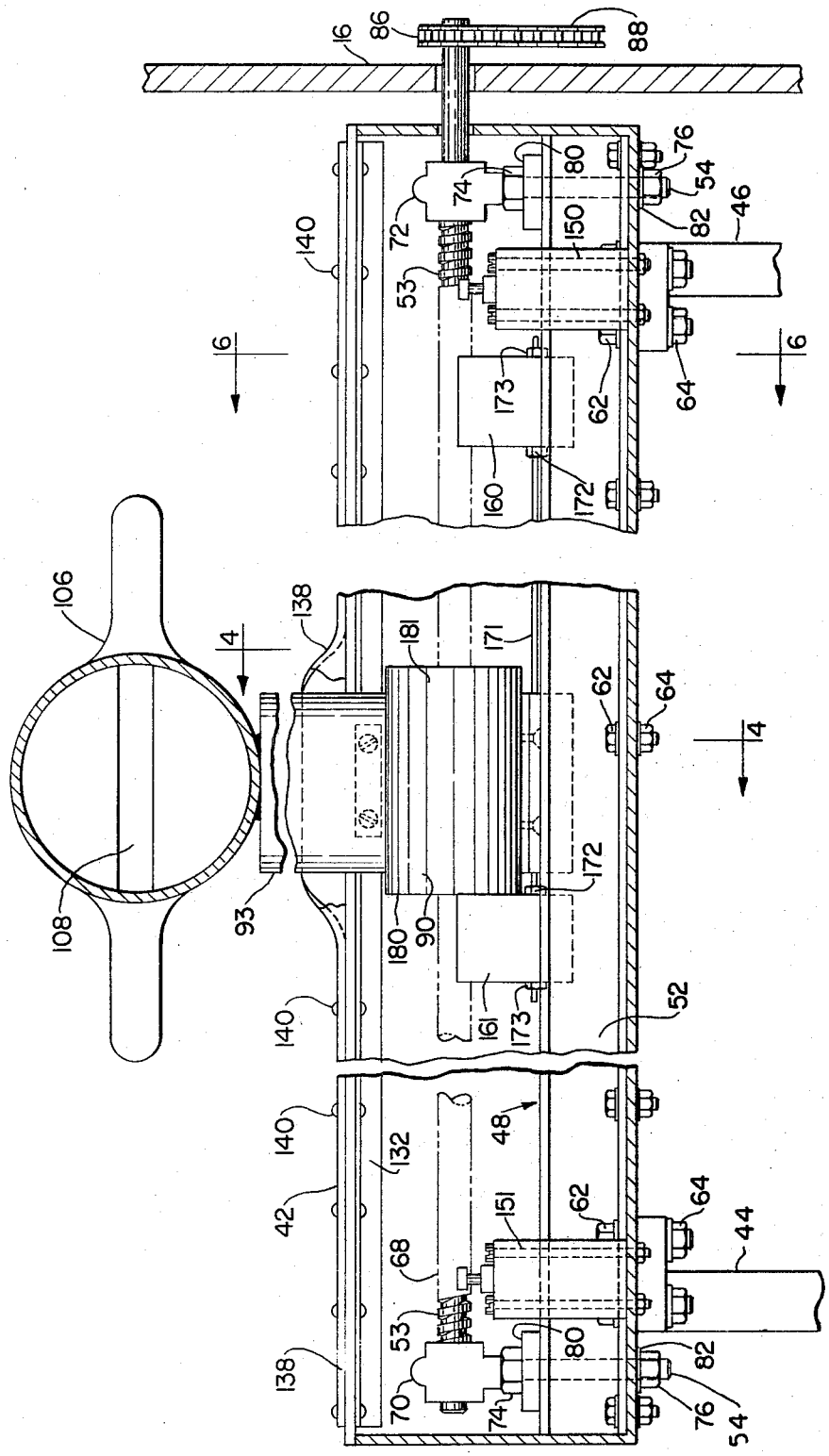
FIG. 3 is an enlarged, sectional view of the nozzle cleaning apparatus showing the drive means of FIG. 1.
Figure 4:
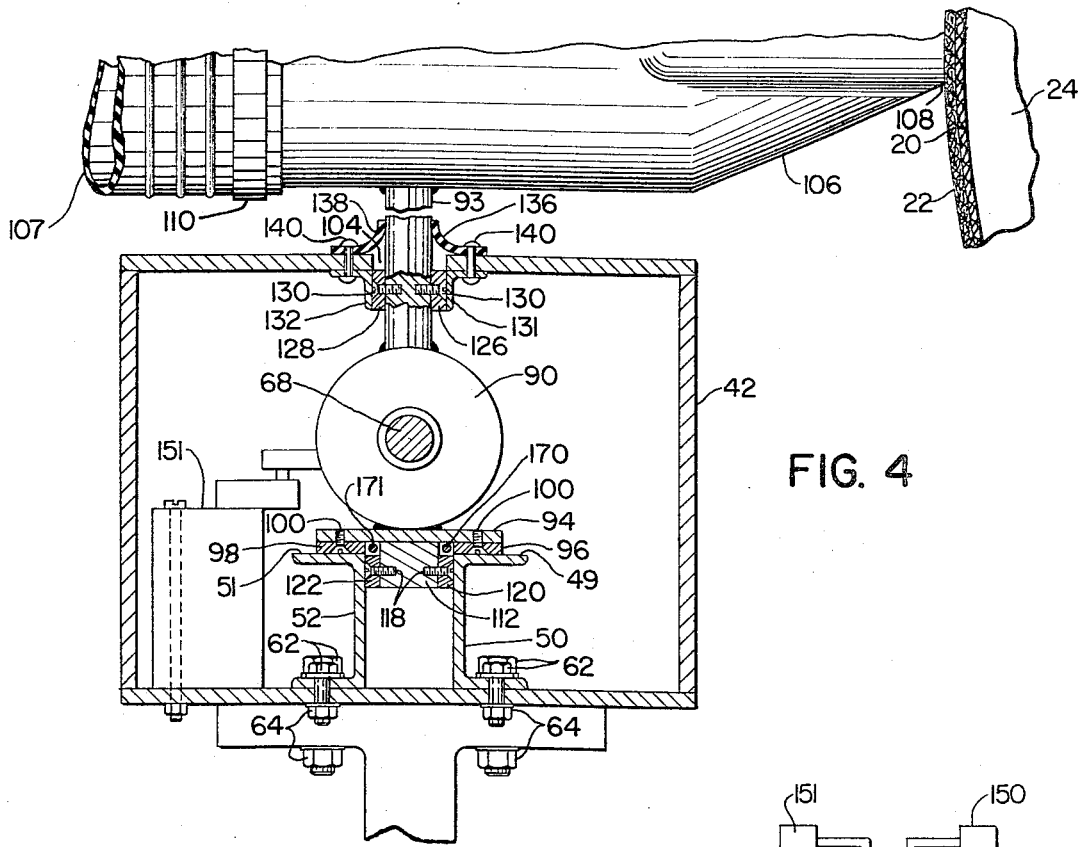
FIG. 4 is an enlarged, sectional view taken along lines 4—4 of FIG. 3.

Cleaning apparatus means 40 for removing accumulations of lint and other substances from the surface of the filter media is positioned adjacent to the cylindrical surface of the rotary drum filter and extends longitudinally thereof for at least the full length of the cylindrical surface which is covered with filter media. These means 40 comprise a housing 42 (as seen in FIGS. 3, 4 and 6) having a rectangular cross section and closed ends. The housing 42 is supported at its ends on columns 44 and 46.

Guide means 48 are provided extending along the base of the housing 42 and on the inside thereof. These guide means 48 comprise channel members 50 and 52 which are suitably attached to the housing 42 and to the columns 44 and 46, as by bolts 62 and nuts 64. The channel members 50 and 52 have guide surfaces 49 and 51, respectively.

A drive screw 68, having a course thread with substantially flat crests 53, extends longitudinally of the housing 42 and parallel to the guide means 48. The drive screw 68 is supported at its ends by end bearings 70 and 72, each having bolt portions 54 which are mounted rigidly on the channel members 50 and 52 by nuts 74 and 76 and washers 80 and 82. More particularly, the end bearings 70 and 72 support the drive screw parallel to the guide surfaces 49 and 51 and in a spaced relationship thereto.

The drive screw 68, as seen in FIG. 1, is rotated by a reversible drive means which includes sprocket 86 a link chain 88 and a sprocket 89 which is connected to the shaft of a reversible electric motor 92. The motor 92 is connected to a suitable electric source, see FIG. 7, and rotation of the motor in either direction produces a corresponding rotation of the drive screw 68. The drive means is located preferably on the air discharge side of the end wall 16, that is, on the side of the filter 10 having filtered or lint free air in order to reduce accumulations of lint on the drive means.

A suction nozzle 106 is mounted on the drive screw 68 and presents an inlet end 108 which is positioned closely adjacent to the filter media 22 of the drim filter 10. In particular, a support plate 93 is attached as by welding at one end to the nozzle 106 and at an opposite end is welded to a nut or driven member 90. The driven member 90 has threads in an axial bore, and the threads engage the threads of the drive screw 68. The other end 110 of the suction nozzle is connected by a flexible hose 107 to a suitable, conventional vacuum source 109.

With reference to FIG. 4, means are provided for supporting the driven member 90 and for guiding it as it moves longitudinally of the drive screw so that the driven member will position the suction nozzle closely adjacent to the filter media 22 as the suction nozzle is caused to traverse the width of the filter 10. In particular, a plate 94 is welded on the bottom portion of the driven member 90 and bearing pads 96 and 98 are fastened to the lower surface of the plate 94 by screws 100. The pads 96 and 98 are a proper thickness to fill the space between the plate 94 and the top surface of the channels 50 and 52, thereby slidably supporting the assembly including the drive member, the drive screw 68 and the suction nozzle.

Further, a block 112 is welded to the lower surface of the plate 94 and extends into the space between the channel 50 and 52 in spaced relation thereto. Bearing pads 120 and 122 are attached to block 112 by screws 118. The pads 120 and 122 have surfaces which are in sliding contact with opposing surfaces of the channel supports 50 and 52, respectfully. Upon any tendency of the driven member 90 to rotate, one or the other of the pads 120 and 122 presses against the opposing surface of the channel supports 50 and 52, respectively, and prevents rotation of the driven member 90.

The plate 93 is guided as the driven member 90 travels along the drive screw 68 by means of pads 126 and 128 which are secured to the plate 93 by screws 130. The pads 126 and 128 present surfaces which oppose surfaces of angle member 131 and 132 which are secured to the housing 42 by rivets 140 and extend parallel to the edge of the slot 104 in the housing 42.

As the housing 42 is positioned in unfiltered or lint laden air, means are provided to close the slot 104 to prevent lint from entering and accumulating in the housing 42. This means includes resilient overlapping flaps 136 and 138. These flaps 136 and 138 are attached to the housing by the rivets 140 which also attach the angle member 131 and 132 to the housing 42.

Figure 7:
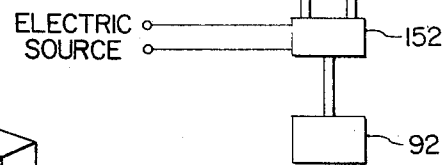
FIG. 7 is a schematic diagram of an electrical control arrangement for the drive screw shown in FIG. 3.

The direction of rotation of the reversible motor 92 is controlled by limit switches 150 and 151 at the axial ends of the housing and by a reversing relay 152. As seen in FIG. 7, the relay 152 is actuated by the limit switches and controls the manner in which the motor 92 is connected to the electric source to thereby control the direction of rotation of the motor 92 and the drive screw 68. The reversing relay 152 contains a time delay such that upon being actuated by a limit switch 150 or 151, the relay disconnects the motor 92 from the electrical source for a predetermined period of time following which the motor is actuated for reverse rotation.

Figure 5:
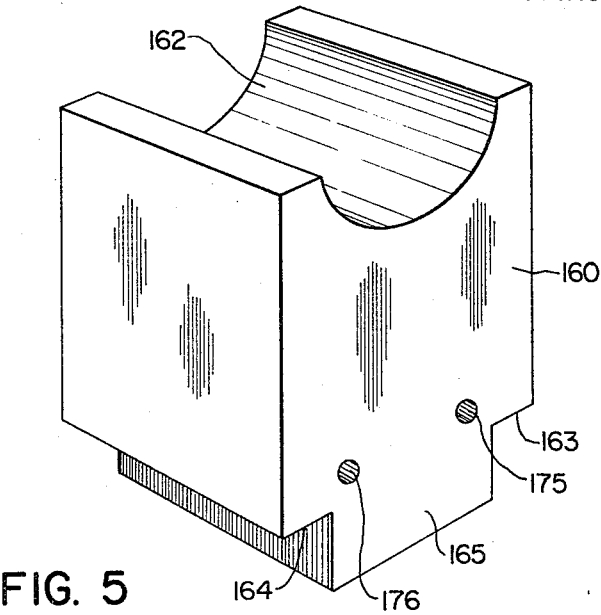
FIG. 5 is an isometric view of the support block shown in FIG. 3.

In accordance with the present invention, movable bearing means are provided for supporting the drive screw 68 between the driven member 90 and the end bearings 70 and 72. These movable bearing means comprise blocks 160 and 161 which are preferably formed from wood, each block having a bearing groove 162 (FIGS. 5 and 6) which receives the drive screw 68 and permits relative rotation of the drive screw therein. The lower portions of the blocks 160 and 161 have a notched portion to form bearing surfaces 163 and 164 which ride on the channels 50 and 52. Further, the notched portion 165 has a width which corresponds to the distance between the opposed surfaces of the channels 50 and 52 to guide the blocks 160 and 161 on the channels.

The blocks 160 and 161 are positioned on the channels 50 and 52 on opposite sides of the driven member 90. The blocks are spaced by two metal rods 170 and 171 which extend through holes 175 and 176 in each of the blocks 160 and 161. Both ends of the rods 170 and 171 are threaded and the blocks 160 and 161 are secured on the ends, respectively, of the rods 170 and 171 by nuts 172 and 173 on opposite sides of the blocks. The length of the rods 170 and 171, and hence the spacing of the blocks 160 and 161, may be selected to position the blocks to obtain an optimum support for the drive screw.

For example, the blocks may be separated by a distance equal to half of the travel of the nozzle 106, and thus the drive screw 68 would always be supported by bearings which are separated by a distance which is never less than half of the travel of the nozzle.

In operation, the motor 28 rotates the drum 20. The motor 92 is connected to the electrical source to rotate the drive screw 68 in one direction, for example to cause the vacuum nozzle 106 to travel from the right to the left in FIGS. 1 and 4. This causes the suction nozzle to move axially of the rotary drum 10 and to vacuum a spiral, overlapping path on the filter media 22 on the surface of the drum filter as it rotates.

As the vacuum nozzle 106 moves along the drive screw 68, its surface 180 engages a surface of the block 161 and pushes the block along on the channels 50 and 52. The other block 160 is pulled along the channels 50 and 52 by the rods 170 and 171. As the block 160 is pulled along, it provides a movable bearing support for the drive screw 68 at a location substantially half way between the nozzle 106 and the end bearing 72.

When the driven member 90 approaches the end of the drive screw 68, it trips limit switch 151 which actuates the relay 152. The relay disconnects the motor from the electric source for a time period which is sufficient for the rotary drum 10 to make one complete rotation so that the suction nozzle 106 can vacuum the filter media 22 around the entire circumference at the end of the drum.

The relay 152 then connects the motor 92 for rotation in the reverse direction. This causes the driven member 90 and the suction nozzle 106 to travel from left to right in FIGS. 1 and 3. The nozzle 106 in traveling axially of the drum cleans a spiral path across the surface of the rotating drum filter and vacuums accumulated lint therefrom.

As the driven member 90 travels to the right, its surface 181 will meet the block 160 and push it along on the channels 50 and 52. The block 161 will be pulled this time by the rods 170 and 171. Upon reaching the end of its travel, the driven member trips the limit switch 150 which actuates the relay 152 to disconnect the motor 92 from the electric source. After a time delay to permit a full sweep of the drum by the vacuum nozzle, the cycle is repeated.

The above described cleaning apparatus may, of course, be used to clean other equipment than a rotary drum where the length of travel of the suction nozzle, and therefore the length of the drive screw, are substantial.

We claim:

1. In apparatus for vacuum cleaning a surface of a rotary drum filter, a drive screw having a threaded length at least as great as the length of the said surface to be cleaned, bearing means supporting said drive screw at the ends thereof and positioning said drive screw parallel to said drum filter, means for rotating said drive screw in said bearing means, driven means operatively engaging the threads of said drive screw for advancing said driven means along the entire threaded length of said drive screw upon rotation of said drive screw, a suction nozzle on said driven means, guide means parallel to said drive screw, first support means engaging said guide means and said driven means for supporting said driven means, the improvement comprising second supporting means engaging said guide means and said drive screw for supporting said drive screw against sagging at locations intermediate said first support means and each said bearing means supporting the ends of said drive screw.

2. In apparatus as described in claim 1, said second support means comprising rigid members having surfaces which engage said guide means and said drive screw, for movement slidably along said guide means and said drive screw.

3. In apparatus as described in claim 2, said second supporting means comprising spacer means connecting said rigid members to maintain a spaced relationship therebetween.

4. In apparatus as described in claim 3, said rigid members being moved along said guide means and said drive screw by movement of said first support means.

5. In apparatus as described in claim 4, each of said rigid members comprising a wood block and said spacer means comprising a rod connected at each end thereof to one of said wood blocks, respectively.

* * * * *